(12) United States Patent
Divvi et al.

(10) Patent No.: US 12,213,046 B2
(45) Date of Patent: Jan. 28, 2025

(54) METHOD AND SYSTEM FOR SUPPORTING EMERGENCY VOICE SERVICES OVER WIRELESS LOCAL AREA NETWORK (WLAN) USING DYNAMIC SSID DEPLOYMENT

(71) Applicant: Charter Communications Operating, LLC, St. Louis, MO (US)

(72) Inventors: Venkata Ramana Divvi, Centennial, CO (US); Christopher J. Teague, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 327 days.

(21) Appl. No.: 17/558,072

(22) Filed: Dec. 21, 2021

(65) Prior Publication Data
US 2023/0156448 A1 May 18, 2023

Related U.S. Application Data

(60) Provisional application No. 63/278,555, filed on Nov. 12, 2021.

(51) Int. Cl.
*H04W 4/90* (2018.01)
*H04W 12/06* (2021.01)
(Continued)

(52) U.S. Cl.
CPC ............ *H04W 4/90* (2018.02); *H04W 12/06* (2013.01); *H04W 76/50* (2018.02); *H04W 84/12* (2013.01)

(58) Field of Classification Search
CPC ....... H04W 4/90; H04W 76/50; H04W 12/06; H04W 84/12
See application file for complete search history.

(56) References Cited

U.S. PATENT DOCUMENTS 6,493,629 B1 * 12/2002 Van Bosch ............ G08G 1/205
701/515
7,746,897 B2    6/2010 Stephenson et al.
(Continued)

FOREIGN PATENT DOCUMENTS

JP    2012147062 A  *  8/2012
JP    2021069085 A  *  4/2021
(Continued)

OTHER PUBLICATIONS

Google Patents Translation JP7235310B2 (Year: 2019).*
JP2021069085A Search Translation (Year: 2019).*
JP7235310B2 Search Translation (Year: 2019).*

*Primary Examiner* — Matthew C Sams
(74) *Attorney, Agent, or Firm* — THE MARBURY LAW GROUP, PLLC (57) ABSTRACT

Methods and devices are disclosed for supporting emergency service calls using dynamic service set identifier (SSID) deployment in a wireless communication network. An access point may receive an emergency service call request from a user device. The access point may also send a message with information about the received emergency service call request to a wireless network manager, and determine whether determining whether to serve the emergency service call request based on a response message received from the wireless network manager. In response to determining to serve the emergency service call request, the access point may create a new service set identifier (SSID) with emergency service call capability.

24 Claims, 7 Drawing Sheets

(51) Int. Cl.
*H04W 76/50* (2018.01)
*H04W 84/12* (2009.01)

(56) References Cited

U.S. PATENT DOCUMENTS

| | | | |
|---|---|---|---|
| 7,877,785 | B2 | 1/2011 | Selignan |
| 8,145,182 | B2 | 3/2012 | Rudolf et al. |
| 9,648,479 | B2 | 5/2017 | Michaelis et al. |
| 9,826,376 | B2 * | 11/2017 | Rudolf ................ H04W 12/06 |
| 10,165,432 | B2 | 12/2018 | Buckley et al. |
| 2008/0016556 | A1 * | 1/2008 | Selignan ................ H04W 4/90 |
| | | | 726/7 |
| 2009/0163170 | A1 * | 6/2009 | Norp .................... G08B 27/006 |
| | | | 455/404.1 |
| 2011/0176481 | A1 * | 7/2011 | Purnadi ................ H04W 76/50 |
| | | | 370/328 |
| 2013/0031615 | A1 * | 1/2013 | Woodward ............. H04W 8/02 |
| | | | 726/4 |
| 2016/0192163 | A1 * | 6/2016 | Miner ..................... G01S 19/24 |
| | | | 455/404.1 |
| 2017/0257750 | A1 * | 9/2017 | Gunasekara ............ H04W 4/06 |
| 2018/0192264 | A1 * | 7/2018 | Kwok .................... H04W 12/08 |

FOREIGN PATENT DOCUMENTS

| | | | | |
|---|---|---|---|---|
| JP | 7235310 | B2 * | 3/2023 | |
| TW | 200922203 | A * | 5/2009 | ............ H04W 12/06 |
| TW | 201640928 | A * | 11/2016 | ............ G01S 5/0252 |
| WO | 2007/078985 | A1 | 7/2007 | |
| WO | WO-2019167082 | A1 * | 9/2019 | |

* cited by examiner

METHOD AND SYSTEM FOR SUPPORTING EMERGENCY VOICE SERVICES OVER WIRELESS LOCAL AREA NETWORK (WLAN) USING DYNAMIC SSID DEPLOYMENT

RELATED APPLICATIONS

This application claims the benefit of priority to U.S. Provisional Patent Application 63/278,555 entitled "Method and system for emergency 911 voice over Wi-Fi call using dynamic SSID deployment," filed Nov. 12, 2021, the entire content of which is hereby incorporated by reference for all purposes.

BACKGROUND

Wireless local area networks (WLANs) are becoming increasingly popular access networks, both in public areas such as hotels, airports, train stations, conference facilities, as well as in proprietary areas such as in company buildings. For example, corporations may install WLANs on their premises to allow freedom of movement to their personnel while providing a relatively high bandwidth compared with legacy mobile networks.

Another development of the past years has been the growing use of Internet Protocol (IP)-based data networks for the transmission of real-time data such as voice and video. Several standards dealing with voice-over-IP (VoIP) applications have been introduced, such as the codec standards G.711 and G.729, and the real-time transport protocol (RTP).

Therefore, updates to current WLAN technology is typically desired in order to handle real-time applications, such as voice over WLAN, as subscribers require the same voice quality, reliability and functionality as exists using a legacy Public Switched Telephone Network (PSTN) telephone or through a mobile network (e.g., third generation partnership project (3GPP) access network, such as a Global System For Mobile Communications (GSM) EDGE Radio Access Network (GERAN), Universal Terrestrial Radio Access Network (UTRAN) or Evolved Universal Mobile Telecommunications Service (UMTS) Terrestrial Radio Access Network (E-UTRAN)).

While voice over WLAN technology is deployed by many wireless service providers, there have been limitations in supporting emergency service voice calls over WLAN. For example, the time and location at which a user device requests emergency help may be unpredictable, as it can be any time during the day from any location for various reasons. Further, different localities may support different emergency numbers and types or categories of emergency calls (e.g. fire, ambulance, police, mountain rescue, etc.). Further, even within the same locality, different public land mobile network (PLMNs) may support different types of emergency call services.

SUMMARY

Various disclosed aspects may include apparatuses and methods for supporting emergency service calls using dynamic service set identifier (SSID) deployment in a wireless communication network. Embodiments include receiving an emergency service call request from a user device, sending a message with information about the received emergency service call request to a wireless network manager, determining whether to serve the emergency service call request based on a response message received from the wireless network manager, and deploying a new service set identifier (SSID) with emergency service call capability in response to determining to serve the emergency service call request.

Some embodiments may further include, in response to determining to serve the emergency service call request, sending to the user device a message identifying the new SSID and network access information indicating Unauthenticated Emergency Service Accessible (UESA), associating the user device with the network using UESA policies; and assigning required network resources to the user device for the requested emergency service call.

In some embodiments, associating the user device with the network may include providing information about the user device location to the wireless network manager.

In some embodiments, associating the user device with the network may include communicating with an access control/location service using Remote Authentication Dial-In User Service (RADIUS) protocol messaging.

In some embodiments, the new SSID may be based on a preconfigured SSID template locally stored on an access point.

Some embodiments may further include receiving, from the wireless network manager, the preconfigured SSID template, and storing the received preconfigured SSID template as a configuration object in a repository on the access point.

Some embodiments may further include determining whether the emergency service call has ended, and withdrawing the new SSID in response to determining that the emergency service call has ended.

In some embodiments, methods may be performed by a wireless access point implementing IEEE 802.11 technical standards.

In some embodiments, the response message received from the wireless network manager may identify a target access point. In some embodiments, the target access point may be selected from among capable access points within a coverage area of the user device.

In some embodiments, selection of the target access point may be based at least in part on proximity of the user device, current network conditions, and a maximum number of concurrent emergency calls allowed per access point.

Further aspects include a computing device having a processor configured with executable instructions to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "user device," "end user device," "computing device," and "wireless device" are used interchangeably herein to refer to any one or all of laptop computers, rack mounted computers, cellular telephones, smart phones, personal or mobile multi-media players, convertible laptops/tablets (2-in-1 computers), personal data assistants (PDAs), personal computers, tablet computers, smart books, ultra-books, notebooks, palm-top computers, desk-top computers, mobile gaming consoles, wireless electronic mail receivers, multimedia Internet enabled cellular telephones, wireless gaming controllers, streaming media players (such as, ROKU™), smart televisions, digital video recorders (DVRs), modems, and similar electronic devices which include a programmable processor and memory and circuitry for establishing wired or wireless communication pathways and for transmitting/receiving data via a telecommunications network as well as providing the functionality described herein. The term "computing device" may further refer to stationary computing devices including personal computers, desktop computers, all-in-one computers, workstations, super computers, mainframe computers, embedded computers, servers, home theater computers, and game consoles.

The terms "telecommunications network," "telecommunications system," "communications system," "service provider network," "service network," and "communication network," "home network" are used interchangeably herein to describe a transmission system that enables user data and control information to be exchanged between various sites, using wired and/or wireless infrastructure. Examples of telecommunication networks that may be used herein include cable television, internet, mobile networks, and combinations thereof.

The terms "Wi-Fi," "wireless local area network," "WLAN," and "access network" may be used interchangeably to refer to a group of devices that form a network based on radio transmissions. The terms "wireless access point" and "access point" may be used to refer to a device that allows one or more wireless devices to connect to a wired network using, for example, Wi-Fi, Bluetooth®, or related standards. The wireless access point may connect to a router (via a wired network), and may relay data between the wireless devices (such as computers, mobile communications devices, etc.) and at least wired device on the network.

The numeric code "9-1-1" or "911" is used herein to refer to a global emergency contact number. However, other localities' equivalent emergency numbers could also be used. For example, the European Union utilizes a "1-1-2" emergency number.

While the term "public safety answer point" or "PSAP" is used herein in connection with emergency response, such term is generic to reference one or more of the following: PSAP; MER Team (Medical Emergency Response Team) as may exist in large facilities; transit emergency response team; and/or any other entity that has jurisdiction or involvement in an emergency and/or as a first responder.

The exemplary systems and methods will also be described in relation to software (such as drivers), modules, and associated hardware. However, to avoid unnecessarily obscuring the present disclosure, the following description omits well-known structures, components and devices that may be shown in block diagram form, are well known, or are otherwise summarized.

The terms "telecommunications service provider," "communications service provider," "network service provider," "service provider," and "network operator" are used interchangeably herein to describe a provider of telecommunications services that controls elements to sell and deliver services to an end user, and provides necessary provisioning and credentials as policies implemented in user device subscriptions.

The terms "user data," "subscriber data," and "device data" are used interchangeably herein to refer to data traffic that is configured for transmission to or reception from one or more user device in subscriber's home network.

The term "server" is used herein to describe any computing device capable of functioning as a server, such as a master exchange server, web server, mail server, document server, or any other type of server. A server may be a dedicated computing device or a computing device including a server module (e.g., running an application which may cause the computing device to operate as a server).

Telecommunications networks are widely deployed to provide various services, such as connectivity to an internet service provider (ISP) or a media content provider, sending and receiving voice data, packet data, broadcast messages, etc.

Market adoption of wireless local area network (WLAN) technology has substantially increased, as users from a wide range of backgrounds and industries have brought this technology into their homes, offices, and increasingly into the public air space. Increasingly users are depending on WLANs to improve the timeliness and productivity of their communications and applications, and in doing so, require greater visibility, security, management, and performance from their networks.

Unlike cellular services, 802-based technology (802.11 WLANs, 802.15 wireless personal area networks (WPANs), etc.) traditionally has not supported emergency calls. For cellular, support of emergency calls resulted from regulatory requirements imposed on the technology and is therefore widely implemented in most wireless cellular networks and handsets. Emergency call support involves many aspects across all communication layers, especially signaling support and mandated procedures. For example, in the United States, the Federal Communications Commission (FCC) requires providers of VoIP services to ensure that all interconnected voice-over-IP calls provide full 9-1-1 capability. Similar requirements exist in many other countries and localities.

With the advent of voice over Internet Protocol (VoIP) in WLANs and increased everyday usage of WLANs, support for emergency calls in WLANs is desired. Issues specific to IEEE 802.11 technology (i.e., 802-based technology) include, but are not limited to, radio access, access point location, caller location, and emergency call admission. For example, with respect to radio access, priorities for emergency calls have not historically existed in the 802.11 standards, with no means to distinguish an emergency call from a regular call for the WLAN access network. Moreover, the location of an access point or a user wireless device is generally unknown to the network in a non-proprietary manner. Thus, for example, even in instances in which the WLAN access point can be easily identified, the location of the identified access point is generally unknown to the network.

With respect to admission, a managed WLAN may prevent emergency callers from establishing an emergency call in instances in which the call initiator is not authorized to enter or utilize the network. The normal connection procedure between a wireless device and an access point requires the wireless device to send an association request, followed by negotiation with the access point prior to associating the device to the access point. For example, in instances in which the access point is a private hotspot or enterprise WLAN, the association request will be refused without proper authentication credentials to access the system. Further, the access point can still refuse admittance to the network based on its configured maximum capacity for voice users.

Current standards that enable emergency service support for voice-over-WLAN require a capable (i.e., authorized) access point within the network (i.e., WLAN) to be configured with required access network options flags, and to advertise emergency service support through beacons and probe response frames that include an Unauthenticated Emergency Service Accessible (UESA) bit set. In this manner, all wireless devices within the vicinity of the supporting access point may receive the details of the dedicated emergency SSID during network discovery, including the UESA bit set that indicates that the network supports emergency services. Using UESA policies, the WLAN may provide internet access to user devices without requiring authentication or subscription, connecting the user call to a PSAP via a mobile network.

In other words, in current systems, each access point that supports emergency services within a network continuously broadcasts dedicated emergency service SSID(s), regardless of whether there is a user device with a need for an emergency service call. However, providing dedicated SSIDs with emergency services configuration in the network may lead to wasted radio and network resources. Thus, in current conventional systems, significant inefficiencies may result from the enabling of emergency services.

Specifically, since dedicated emergency service SSID(s) are visible and available to all devices in the coverage area, user devices may attempt, either accidentally or intentionally, to associate with the network using such emergency service SSID(s) in order to access the Internet, without actually needing emergency services. For example, once a user device has connected an emergency service SSID, it may automatically attempt to reconnect to the network through such SSID as a result of scanning mechanisms. Further, the traffic from such additional association requests to an access point may create network congestion, and can lead to denial of service attacks and/or security vulnerabilities.

Moreover, per the mechanisms defined in current standards (e.g., 802.11u), the access points and backend network are configured to continuously advertise the emergency call support by periodically transmitting beacon frames. Such beacon frames are typically configured to be sent every 100 ms. Since the emergency call rate is typically far less than regular voice-over-WLAN, continuously advertising its support in large-scale high-density environments will have an impact on the network bandwidth and capacity due to its management traffic load on system.

The various embodiments provide improvements to systems that support emergency service calls using voice over WLAN technology by providing connectivity and reliability in case of an emergency, but limiting unnecessary network resource usage.

In various embodiments, new emergency SSIDs may be defined to allow access to the network (e.g., WLAN) in emergency scenarios. The various embodiments may enable a user device (e.g., a wireless communication device) to place an emergency voice call (e.g., connect to a PSAP) over a WLAN by associating with a new SSID dynamically deployed on a per-call basis call in the network. That is, access points in the various embodiments do not broadcast an emergency service SSID by default, but instead are provisioned with an SSID configuration template and set to deploy a new SSID with emergency Service feature enabled upon request.

An emergency call may be initiated on a user's wireless device by sending out a probe request frame that does not include an SSID but advertises an Unauthenticated Emergency Service Request (UESR). In various embodiments, in response to the received probe request, a serving access point may be selected in the network, and that access point may dynamically deploy new SSID for the emergency call. Specifically, the serving access point may send to the requesting wireless device the new SSID and configuration details including Unauthenticated Emergency Service Accessibility (UESA).

Specifically, once a user request for an emergency service voice call over WLAN is intercepted by the network, an access point and/or a group of neighbor access points within the network may be selected as the most appropriate to serve an emergency call request, and that access point or group only may be prompted to create and begin broadcasting the new SSID with emergency services capability.

In various embodiments, present access points within WLANs may be capable of servicing multiple SSIDs per radio (e.g., up to 64 in some embodiments), which allows each service request to be given a unique new SSID. However, to meet the emergency call service requirements and to eliminate system overloading from fraudulent service requests, an access point according to various embodiments may be configured with a maximum number of concurrent emergency calls allowed to be served at one time, for example, a maximum of five (or any other number controlled by the service provider).

A new emergency SSID dynamically deployed by an access point according to various embodiments may be configured to only remain for the duration of the service request. That is, once the emergency service call by the user device is completed, the access point may automatically withdraw that SSID from service.

In various embodiments, telecommunications services may be provided to user wireless devices via a connection to a network, such as a cellular telephone network, WAN, LAN, WLAN, terrestrial network, satellite network, etc., and/or other well-known technologies. Such networks may be accessed via any of a number of wireless and/or wired connections, including through a radio frequency (RF) resource, wireless adapter, coaxial cable, fiber optic cables, DSL interface, Worldwide Interoperability for Microwave Access (WiMAX), or an Integrated Service Digital Network (ISDN) interface.

Figure 1:
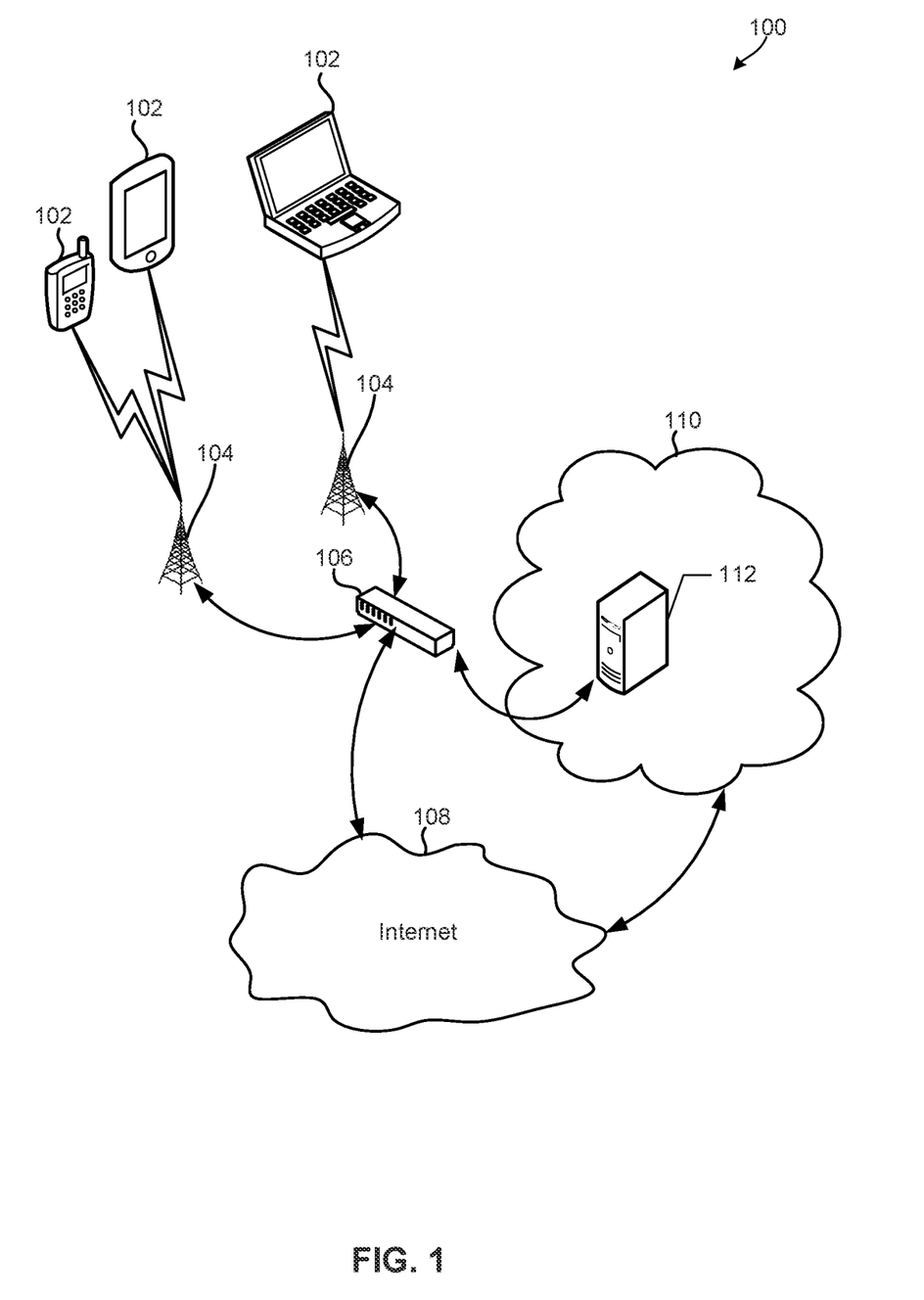
FIG. 1 is a communication system block diagram of a communication network suitable for use with various embodiments.

The various embodiments may be implemented within a variety of communications systems, an example of which is illustrated in FIG. 1. The communications system 100 may be used by a multiple system operator (MSO), internet service provider (ISP), cellular service provider, or other type of service provider that facilitates messaging and/or other network-based messaging/signaling between one or more server connected to the Internet or other external network.

The communications system 100 may include a plurality of end user devices 102, which may be configured to communicate via a Wi-Fi network, an Ethernet network, a cellular telephone network, a radio access network, a WiMAX network, and/or other well-known technologies. The end user devices 102 may each be configured to receive and transmit data and control signals to and from an access point 104 (e.g., a wireless access point, router, hub, broadband gateway, base station, etc.), which may be coupled to a controller operable to transmit the data and control signals between to other network destinations. The controller may be, for example, a service gateway, wireless LAN controller (WLC), cellular base station, radio network controller, etc. For each end user device 102, signaling with the access point 104 may be performed via a wireless and/or a wired connection.

The access point 104 may communicate with an access gateway 106 of a communications service provider (e.g., a packet data network gateway (PGW), a cable modem termination system (CMTS), a wireless access gateway (WAG), broadband network gateway, etc.) that serves as the primary point of entry and exit for end user device traffic. The access gateway 106 may be implemented in a single computing device or in many computing devices.

Functions of the access gateway 106 may include, but are not limited to, forwarding data and control signals to network components as user data packets, providing connectivity to external data sources/networks, managing and storing network/internal routing information, and/or acting as an anchor between different technologies (e.g., Wi-Fi, broadband, 3G/4G/5G systems, etc.). The access gateway 106 may also coordinate the transmission and reception of data to and from the Internet 108, and the transmission and reception of voice, data and control information to and from an external service network connected to the Internet 108, as well as other access points 104.

Through the access gateway 106, the end user devices 102 may be connected to a service network 110 either directly or via the Internet 108. The service network 110 may control a number of services for individual subscribers, such as management of billing data and selective transmission of data, such as multimedia data, to a specific end user device 102. The service network 110 may be implemented in a single computing device or in many computing devices, and typically includes one or more server 112, such as a media server of a content provider, a communication server, etc.

Each end user device 102 may be, as noted above, a variety of devices. For example, each end user device 102 may be a smartphone, a laptop computer, a tablet computer, a smartphone, or any other suitable end point device capable of connecting to a LAN. In general, the end user devices 102 may include a platform that can receive and execute software applications, data and/or commands transmitted over the communication network that may ultimately come from the service network 110, the Internet 108 and/or other remote servers and networks.

The various embodiments are particularly useful with Wi-Fi or other IEEE 802.11 networks to obtain access to service provider core network. However, the embodiments may also be implemented over any combination of wireless and/or wired networks and access protocols, with no changes to the methods, such as broadband networks (e.g., optical network, wireless satellite, cable modem or DSL modem etc.).

In various embodiments, a WLAN may be represented by one or more wireless access points (e.g., access point 104), an interface to the WLAN, and the medium carrying data between one or more user wireless communication device and the interface to the WLAN (i.e., the air interface).

In various embodiments, an SSID (i.e., network name or identifier) may refer to a unique case-sensitive string of up to 32 alphanumeric characters that identifies a radio network based on IEEE 802.11. In various embodiments, each access point of a WLAN may be capable of simultaneously providing multiple SSIDs.

Figure 2:
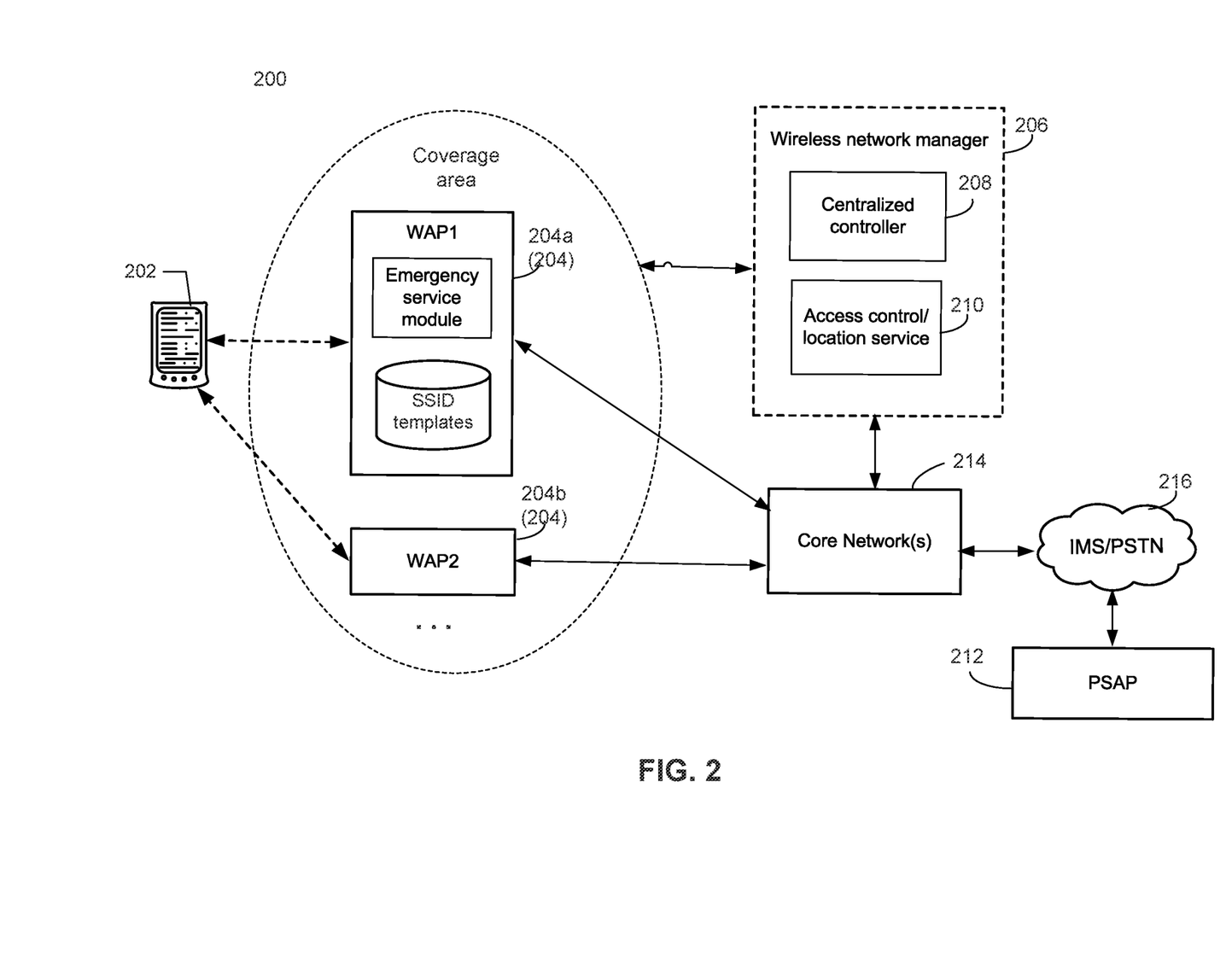
FIG. 2 is a block diagram illustrating an example architecture of a communications system supporting emergency service voice calls according to various embodiments.

An architecture of an embodiment system to support emergency call over WLAN implemented by a service provider network is illustrated in FIG. 2. With reference to FIGS. 1 and 2, the system 200 may be similar to communications system 100 and/or components thereof.

The system 200, which may be configured to provide communications services to one or more wireless device 202, may include at least one wireless access point, shown as wireless access point ("WAP") 204a and WAP 204b, and wireless network manager 206 including a centralized controller 208, and an access control/location service 210.

The wireless access point(s) 204a, 204b may be operative to wirelessly communicate with user devices, such as wireless device 202. In some embodiments, the wireless access points 204a, 204b may implement the wireless network protocol specified in the IEEE 802.11 WLAN specification. While the example coverage area for the wireless device 202 is illustrated in FIG. 2, as including two wireless access points 204a, 204b, it should be understood that any number of access points may be included. In various embodiments, each wireless access point 204 (i.e., 204a, 204b) in the coverage area that is configured to support emergency call services over WLAN may include an emergency service module, and a database/repository capable of storing at least one SSID template as a configuration object. While shown only for wireless access point 204a, it should be understood by those of ordinary skill in the art that the emergency service module and the SSID template database are included in all wireless access points 204 (i.e., 204a, 204b) that are configured to support emergency service voice calls according to the various embodiments.

The emergency service module according to various embodiments may be an application that may be configured to implement steps to recognize that an emergency call has been requested, and to provide a response and requested resources if appropriate, according to various embodiments and as described in further detail below.

The centralized controller 208 of the wireless network manager 206 may be configured to manage traffic and resource allocation of for an associated wireless network between the wireless access points 204.

In some embodiments the centralized controller 208 may be configured to manage and distribute an emergency SSID template to the wireless access points 204 associated with the wireless network manager 206. The emergency SSID template according to the various embodiments may be a data structure that includes configuration instructions for creating a new SSID with emergency service features enabled.

In some embodiments, the centralized controller 208 may be configured to receive a notification from at least one wireless access point 204 in embodiments in which a user within the coverage area has requested an emergency call (e.g., by dialing 9-1-1 and triggering a probe request that is intercepted by the wireless access point 204 (e.g., WAP 204a, WAP 204b). In some embodiments, the centralized controller 208 may coordinate selection of a serving access point (e.g., WAP 204a or WAP 204b) to provide the emergency call based, for example, on network, bandwidth, and proximity conditions. In some embodiments, the centralized controller 208 may create an emergency SSID template in response to receiving notification of the emergency call request, and send the emergency SSID template to the serving access point once selected (e.g., WAP 204a or WAP 204b). Upon receipt, the network processor of the access point (e.g., WAP 204a or WAP 204b) may store the emergency SSID template in a repository as a configuration object.

In various embodiments, the selected access point (e.g., WAP 204a or WAP 204b) may deploy a new emergency service call ("e911") SSID using a preconfigured emergency SSID template received from the centralized controller 208. In other embodiments, the selected access point (e.g., WAP 204a or WAP 204b) may create the emergency SSID template once it has been selected as the serving access point. Such functions may be implemented as one or more software module in an application executed on a processor, as one or more hardware module (e.g., hardware component(s) wired to perform such functions), or as combinations of hardware component(s) and software module(s) running on one or more processors.

In some embodiments, the functions of the centralized controller 208 may include further tasks to manage establishing an emergency call routed to a public safety answering point (PSAP) 216 via a wireless access point 204 and at least one core network 214. In various embodiments, the centralized controller 208 may be implemented by one or several interlinked computers, i.e., a hardware platform, a software platform basing on the hardware platform and several application programs executed by the system platform formed by the software and hardware platform. The functionalities of the centralized controller 208 may be provided by the execution of these application programs.

The access control/location service 210 may provide access control to the communication network associated with the service provider (e.g., core network(s) 214), such as by providing access control rules that may be stored in memory, and filtering arriving data packets before admitting them to the communication network based on such rules. In various embodiments, the access control/location service 210 may be implemented by one or more server such as an authentication, authorization, and accounting (AAA) server.

The access control/location service 210 may also include functions to locate and store information regarding the position of user devices (e.g., 202) associated with the communication network. In various embodiments, the location of a user wireless device 202 may be identified and/or updated by extracting information from messages received from that user wireless device 202 during association with a wireless access point 204 (e.g., 204a). Such information may be provided from the serving wireless access point 204 using any of a number of supported networking protocols, such as Remote Authentication Dial-In User Service (RADIUS)) messaging. The access control/location service 210 may also use any of a number of supported networking protocols for communication with other entities in the system (e.g., with elements of the core network(s) 214).

The system 200 may also include components of various core networks. The core network(s) 214 may include an IP core network (e.g., Wi-Fi), as well as one or more mobile core network (e.g., an LTE network, 2G/3G network, etc.).

The IP core network may provide a gateway between a WLAN and the one or more mobile core network. Components of an IP core network may include, for example, a Tunnel Termination Gateway (TTG)/Packet Data Gateway (PDG). The IP core network may also include network services such as a DHCP server that allocates a unique Internet Protocol (IP) address to each wireless device 202 upon association with a wireless access point 204 in order to access the network. In some embodiments, the DHCP server may be connected to a DHCP database. Additionally or alternatively, the DHCP server may be used to assign address or access information using other protocols.

In some embodiments, an LTE mobile core network may be an evolved packet core (EPC) that includes, for example, at least one Mobility Management Entity (MME), a Serving Gateway (SGW), and a Packet Data Network (PDN) Gateway (PGW).

In some embodiments, the system 200 may include one or more radio access network that uses cellular network protocols, for example, an LTE radio access network (e.g., Evolved UMTS Terrestrial Radio Access Network (E-UTRAN)). The E-UTRAN may connect to the EPC through the SGW, which may be logically connected to the PGW. The MME may handle tracking and paging of a wireless device 202 and security for E-UTRAN access on the EPC. The MME may be linked to a Home Subscriber Server (HSS), which may support a database containing user subscription, profile, and authentication information. Further, the MME may provide bearer and connection management for user Internet protocol (IP) packets, which are transferred through the SGW. The SGW may route, via external IP networks (e.g., PDN(s)), incoming and outgoing IP packets for wireless devices connected to the SGW. The E-UTRAN. The SGW may also provide an anchor point for handovers between access points of the E-UTRAN (e.g., eNodeBs). The SGW may be logically connected to a PDN Gateway (PGW), which may route packets to and from PDNs to form a connection between the EPC and various PDNs. The PGW may be logically connected to a Policy Charging and Rules Function (PCRF), a software component that may enforce minimum quality of service parameters, and manage and control data sessions. The PGW may also provide connections with other public or private networks (e.g., the Internet, an Intranet, an IP Multimedia Subsystem (IMS), etc.). The mobile core network(s) may further include a circuit switched network and/or packet switched network. For example, a PS core may be a UMTS core network that includes a Serving GPRS support node (SGSN) and a Gateway GPRS support node (GGSN). The SGSN may provide an interface with (or gateway to) an access network (e.g., a radio access network or a WLAN), and the GGSN which may be connected to external PS networks (i.e., the Internet, various PDNs, etc.).

The system 200 may also include IMS/Public Switched Telephone Network (PSTN) 216, which may be in communication with the core network(s) 214. For example, a PGW may provide the connection to the IMS in an LTE network (e.g., EPC). In this manner, the IMS may provide communication between the mobile core network (e.g., EPC) with the PSTN. Further, the IMS may provide an interface with additional external packet data networks. In this manner, voice calls may take place over both traditional telephony services and IP-based services.

The system 200 may also include a PSAP 212, to which data packets related to an emergency voice call may be routed via the core network(s) 214 and IMS/PSTN 216. Therefore, the dialing of an emergency service number by a user connects the user's wireless device 202 to a dispatcher at a PSAP 212 trained to route the emergency call to local emergency medical, fire, and law enforcement agencies. Specifically, in various embodiments, the PSAP 212 may be a call center, and an operator may verify the user's location, determine the nature of the emergency, and decide which emergency response teams should be notified (e.g., fire, police, rescue, etc.). In some embodiments, the PSAP 212 may use information from the wireless network manager 206 to ensure the shortest possible emergency response time. For example, such location information may include the user's location collected/updated by the access control/location service 210 as a result of signaling from the serving wireless access point 204 during association with the user's wireless device 202. In some embodiments, the user's call may be transferred from a primary PSAP to a secondary PSAP.

In some embodiments, additional location information associated with the serving wireless access point 204 may be used to connect a user's wireless device 202 to the PSAP 212. In some embodiments, such location information may be provided through SIP messaging with the core network(s) 214, such as in a portion of a SIP INVITE message. The wireless access point 204 location may be stored in a wireless network registry of a user wireless device 202 upon establishing a call. Thus, in embodiments in which an outbound 9-1-1 call from a user's wireless device 202 is a SIP-based communication, a SIP location field may be utilized to forward the location of the wireless access point 204 in the SIP INVITE message. The identification and/or location of the wireless access point 204 may be used by the core network to assist with routing the 9-1-1 communication to the appropriate PSAP 212 and/or any other entity that has jurisdiction or involvement in an emergency.

The term "system-on-chip" or "SoC" is used herein to refer to a set of interconnected electronic circuits typically, but not exclusively, including multiple hardware cores, a memory, and a communication interface. The hardware cores may be of a variety of different types of processors, such as a multi-core central processing unit (CPU), a multi-core digital signal processor (DSP), a multi-core accelerated processing unit (APU), and a multi-core auxiliary processor.

Figure 3:
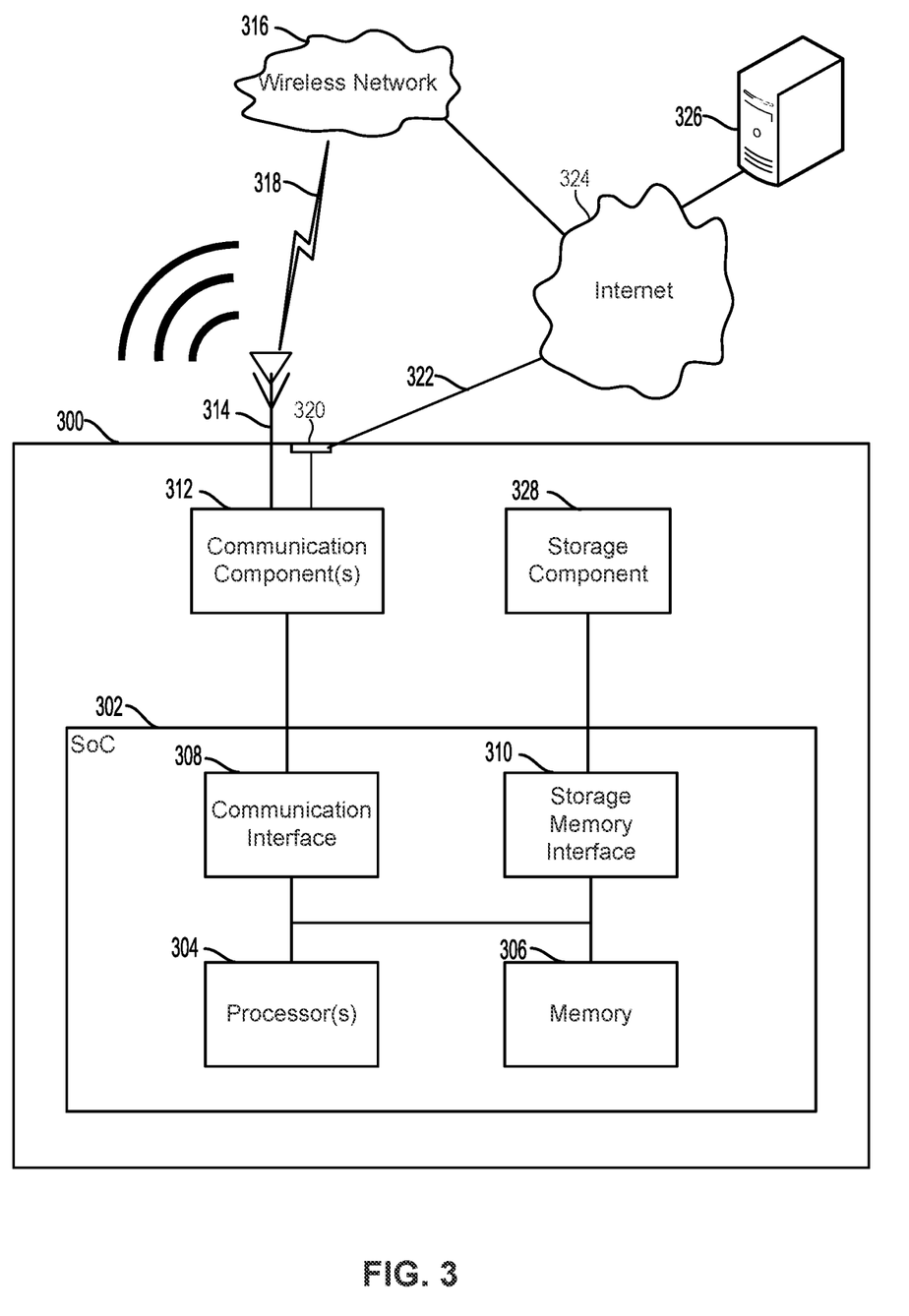
FIG. 3 is a component block diagram illustrating a network computing device suitable for implementing an embodiment.

FIG. 3 illustrates an example of an access point 300 configured to deploy new SSIDs configured for emergency service calls (e.g., e911 SSIDs) that may be suitable for use with the various embodiments. With reference to FIGS. 1-3, the access point 300 may be an example of one or more wireless access point 204.

The access point 300 may include a SoC 302 with a processor 304, a memory 306, a communication interface 308, and a storage memory interface 310. The access point 300 may further include one or more communication component 312, such as a network interface (e.g., an 802.3 interface) for communication with a LAN, a wireless network interface 320 (e.g., an IEEE 802.11 WLAN interface) for wireless communication with one or more wireless communication devices over Wi-Fi, a radio frequency (RF) transceiver (or other receiver and transmitter circuitry) configured to perform transmit/receive functions in particular RF spectrum frequency range(s), etc.

The communication component(s) 312 and corresponding antenna(s) 314 may be configured to send data to, and receive data from, devices within a WLAN using a supported wireless communication protocol. Further, a communication component(s) 312 and corresponding antenna 314 may be configured to access an external wireless network 316 for additional features and/or network services. A connection 318 to the wireless network 316 may use any of a number of wireless standards, for example, Wi-Fi, WiMAX, or mobile VoIP, and/or may be based on mobile broadband or cellular network technology. Examples of wireless networks based on cellular network technology may include Code Division Multiple Access (CDMA) networks, Time Division Multiple Access (TDMA) networks, and Frequency Division Multiple Access (FDMA) networks. The wireless network 316 may utilize various radio technologies such as Wideband-CDMA (W-CDMA), cdma2000, Global System for Mobile Communications (GSM), etc.

The communications component(s) 312 may also be coupled to a network interface 320 that supports a wired connection 322 to the internet 324. The home gateway 300 may communicate with, for example, one or more remote computing device 326 over the wireless connection 318 and/or the wired connection 322. In some embodiments, the remote computing device may be a server associated with a service provider.

The wireless access point 300 may also include software modules (including Dynamic Host Configuration Protocol (DHCP) clients, and device drivers (e.g., network and WLAN interface drivers) stored in the memory 306 (e.g., a hard disk drive, flash memory, EEPROM, etc.). At start up, these software components may be loaded into system memory and then accessed and executed by processor 304.

The access point 300 may include one or more controller, on which any of a variety of processing devices of the SoC 302 (e.g., processor(s) 304) may be implemented, and may include a number of processing cores. The access point 300 may also include processors that are not associated with a SoC 302. In various embodiments, the processor(s) 324 may execute any number of applications, including an emergency service module.

The memory 306 of the SoC 302 may be configured for storing data and processor-executable code for access by the processor 304. The memory 306 may include, for example, volatile memory configured to temporarily hold a limited amount of data received from a data sensor or subsystem.

The access point 300 may also include a storage component 328, which may be a non-volatile memory device (e.g., a read-only memory, flash memory, hard disk drive, solid state drive, etc.). The storage memory interface 310 and storage component 328 may work in unison to allow the access point to store data (e.g., SSID template(s)) and processor-executable code on a storage medium. The storage memory interface 310 may control access to the storage component 328, and may allow the processor 304 to read data from and write data to the storage component 328.

The communication interface 308, communication component(s) 312, antenna(s) 314, and/or network interface 320 may work in unison to enable the home gateway 300 to communicate over the wireless network 316 via a wireless connection 318, and/or a wired connection 322 with the remote computing device 326. As described, the wireless network 316 may be implemented using a variety of wireless communication technologies, including, for example, radio frequency spectrum used for wireless communications, to provide the home gateway 300 with a connection to the Internet 324 by which it may exchange data with the remote computing device 326.

It should be noted that some or all of the components of the access point 300 may be differently arranged and/or combined while still serving the necessary functions. Moreover, the access point 300 may not be limited to one of each of the components, and multiple instances of each component, in various configurations, may be included in the access point 300.

In various embodiments, an operator (or service provider) may support emergency service calls over WLAN by pre-configuring an SSID template with emergency service features ("emergency SSID template"), and providing the template to access points within the communication network. The emergency SSID template may be kept in dormant mode on the access point by storing as a configuration object, but may be retrieved and used to deploy a new emergency service call ("e911") SSID when the need arises.

The wireless access points supporting emergency calls over WLAN within the vicinity of a wireless device (i.e., 102, 202) may intercept a user's emergency call request, and may coordinate the selection of the appropriate serving wireless access point. In various embodiments, the emergency call request may be triggered by the user's native call dialer (e.g., dialing 9-1-1), or may be triggered by a specialized application running on the wireless device. The wireless device may send out a probe request to discover 802.11 networks within its proximity. The probe request may include the wireless device's supported data rates and 802.11 capabilities. In various embodiments, the probe request may have an access network option set to Unauthenticated Emergency Service Request (UESR) to indicate an emergency call request.

In various embodiments, the coordination and selection of a serving access point (i.e., 104, 204, 300) may be performed by the wireless network manager 206, and may be based on any of a variety of conditions (e.g., bandwidth availability, proximity, etc.).

The selected serving wireless access point (i.e., 104, 204, 300) may notified by the wireless network manager 206 to connect the wireless device call request, and may deploy a new e911 SSID using the preconfigured emergency SSID template according to various embodiments. The serving wireless access point (i.e., 104, 204, 300) may start broadcasting the new e911 SSID and send a response message to the wireless device (i.e., 102, 202). The message may be, for example, a probe response message advertising the new e911 SSID, as well as other configuration details (e.g., supported data rates and other 802.11 capabilities).

Once the wireless device (i.e., 102, 202) receives the new e911 SSID, the wireless device may associate to the network, for example, by sending an association request to the serving wireless device including the UESA bit set. As a result, the wireless access point (i.e., 104, 204, 300) may bypass authentication and establish a network connection for the wireless device based on UESA.

Once the emergency service call is completed by the wireless device (i.e., no user activity is detected on the new e911 SSID), the wireless access point may withdraw that SSID according to various embodiments. That is, any subsequent request for a new emergency service call over WLAN may trigger selection of a new serving wireless access point, which will then create another new e911 SSID as described.

Figure 4A:
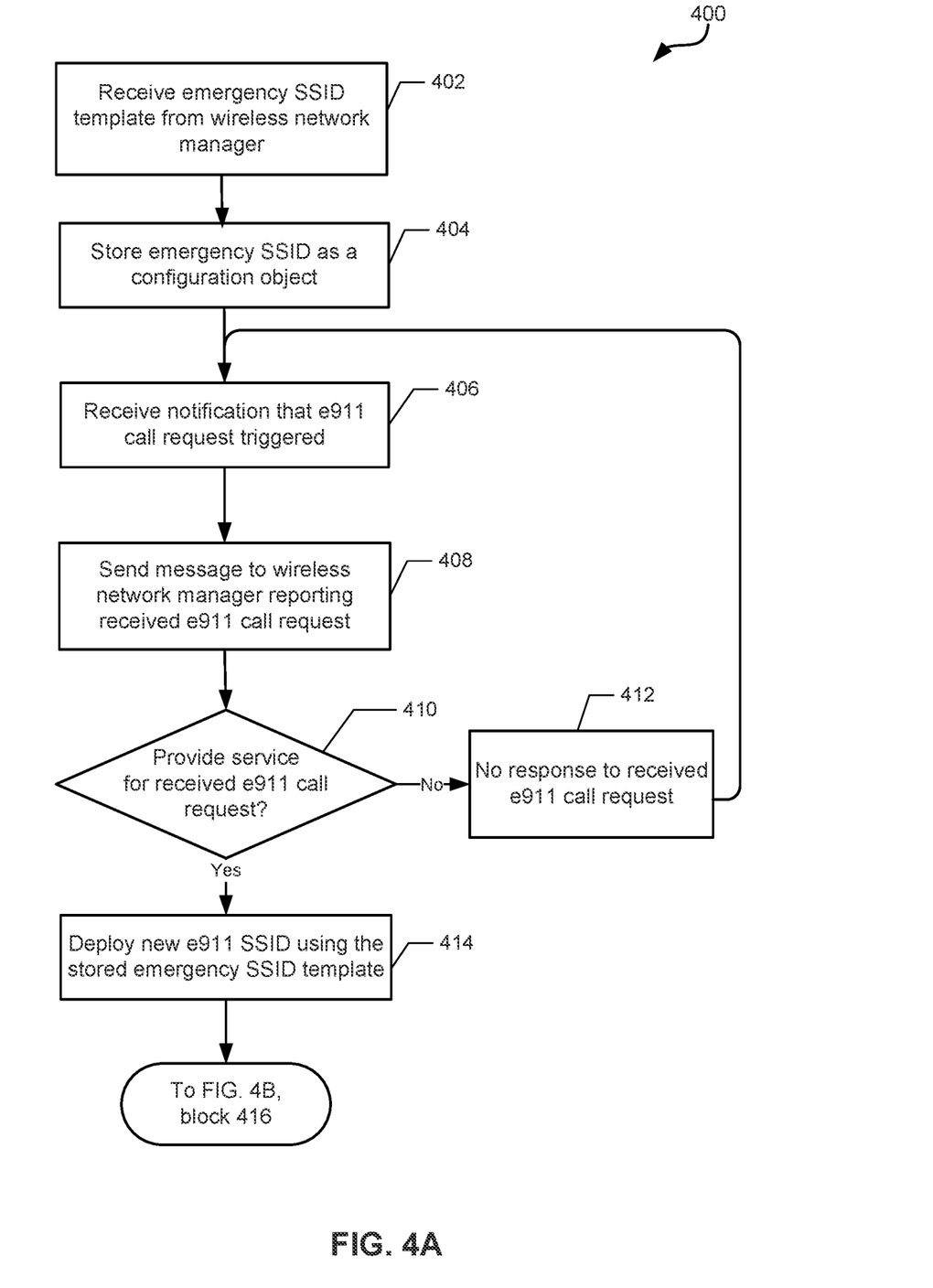
FIGS. 4A and 4B are process flow diagrams illustrating an example method for using dynamic SSID deployment for emergency voice-over-WLAN calls according to various embodiments.
Figure 4B:
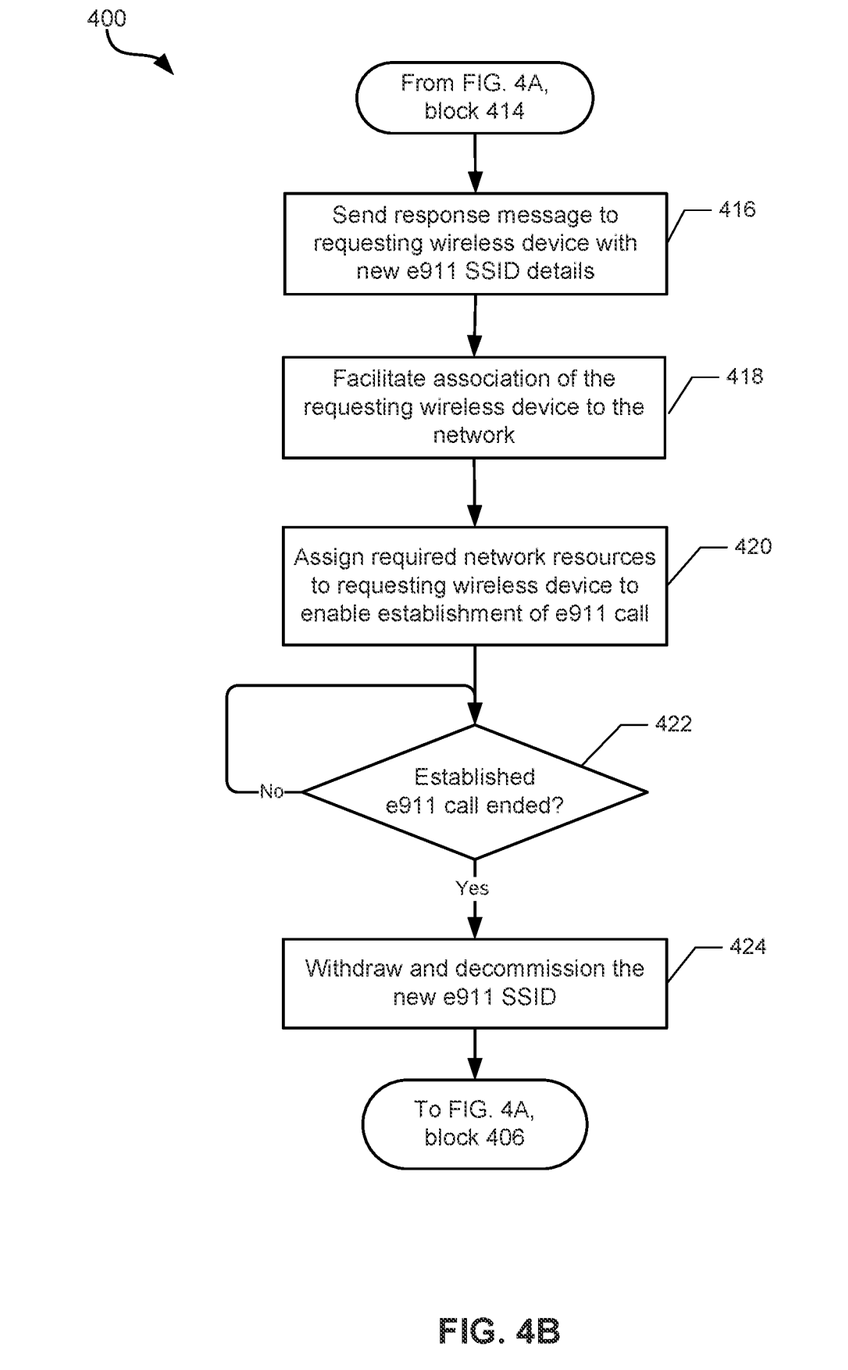

FIGS. 4A and 4B illustrate a method 400 of implementing emergency voice-over-WLAN call support in a wireless communication network according to some embodiments. With reference to FIGS. 1-4B, the operations of the method 400 may be implemented by one or more control entity managed by or associated with a service network (e.g., service network 110), such as on processor(s) (e.g., 304) of a wireless access point (e.g., 204, 300). Some operations of the method 400 may additionally or alternatively be implemented by one or more control entity of a wireless network manager (e.g., 206), such as the centralized controller 208.

While described with reference to one entity (e.g., a wireless access point) and one wireless device, such references are merely used as an example, as the method 400 may be applied by and to any of a number of different access points and devices within the service network.

In block 402, the network processor may receive from a wireless network manager (i.e. 206) an SSID template with emergency service support configurations ("emergency SSID template"). In block 404, the network processor may store the emergency SSID template in a repository as a configuration object.

In block 406, the network processor may receive notification that a request for an emergency voice call over WLAN ("e911 call") has been triggered. For example, the network processor may receive, from a user wireless device within the coverage area of the access point, a probe request that includes the UESR bit set.

In block 408, the network processor may send a message to the wireless network manager reporting the received e911 call request. In various embodiments, the message to the wireless control manager may include any relevant information extracted from the original probe request, including an identity of the requesting wireless device, 802.11 capabilities of the requesting device, etc. In some embodiments, the network processor may also send messages to other wireless access points within the vicinity.

In determination block 410, the network processor may determine whether to provide service for the received the e911 call request. In various embodiments, the wireless network manager may select a serving wireless access point from those that are associated with the service network, configured to support e911 calls, and within a coverage area for the requesting wireless device. In some embodiments, the wireless network manager may communicate the identity of the selected serving wireless access points in a message to all of the wireless access points in the coverage area.

In response to determining not to provide service for the received e911 call request (i.e., determination block 410="No"), the network processor may provide no response to the received e911 call request in block 412, and may return to block 406 for receipt of a new e911 call request.

In response to determining to provide service for the received e911 call request (i.e., determination block 410="Yes"), in block 414 the network processor may deploy a new e911 SSID using the stored emergency SSID template. Specifically, the network processor may retrieve from its local configuration repository the emergency SSID template previously received from the wireless network manager, and generate a new e911 SSID based on the template to serve the present request.

In block 416, the network processor may send a response message to the requesting wireless device with the new e911 SSID details. For example, the response message may be a probe response message that identifies the new e911 SSID for association, and includes a bit set, flag, or other indicator set for UESA.

In block 418, the network processor may facilitate association of the requesting wireless device to the network. In various embodiments, the network processor may receive, from the requesting wireless device, an association request that includes the UESA bit set, and the network processor may complete association based on UESA. Specifically, the network processor may bypass authentication for the wireless device, and apply UESA policies, and send an association response message to the wireless device. In some embodiments, during association the network processor may also communicate with an access control/location service of the wireless network manager to provide and/or update user location information.

In block 420, the network processor may assign the required network resources to the requesting wireless device to enable establishment of the e911 call. In various embodiments, the call establishment may involve assigning an IP address for the wireless device, as well as signaling between elements of the core network(s) and the PSAP to establish a voice call over WLAN.

In determination block 422, the network processor may determine whether the established e911 call has ended. That is, the network processor may determine if there is no active call on the new e911 SSID. In response to determining that the established e911 call has not ended (i.e., determination block 422="No"), the network processor may repeat determination block 422 while maintaining the call. In response to determining that the established e911 call has ended (i.e., determination block 422="Yes"), the network processor may withdraw and decommission the new e911 SSID in block 424.

Thus, any future e911 call requests, whether from the same wireless device or another wireless device, will be served using a next new e911 SSID deployed using the steps of method 400. In various embodiments, withdrawing each e911 SSID after termination of the active call may help to eliminate the previously associated devices automatically attaching to or recognizing the network in the future, reducing network congestion. In various embodiments, the network processor may return to block 406 to receive notification that another new e911 call request is triggered.

The references to various wireless devices and/or wireless access points are arbitrary and used merely for the purposes of describing the embodiments. That is, any indicator, name, or other designation to differentiate messaging associated with different access points and devices may be assigned, without changing the embodiment methods.

Figure 5:
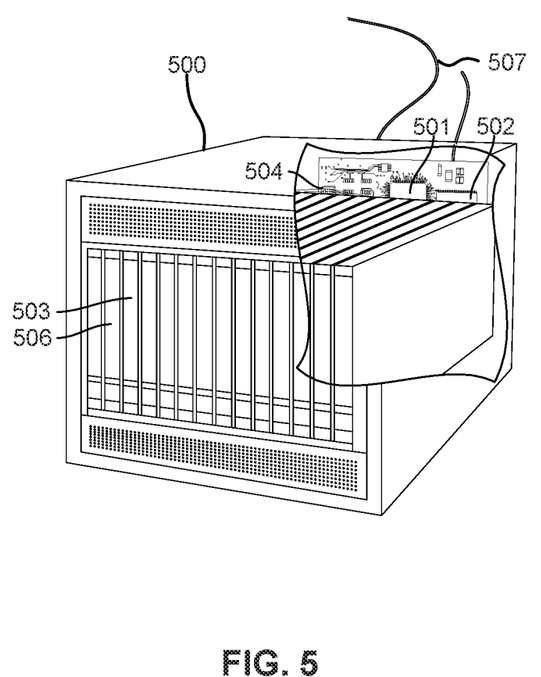
FIG. 5 is a component block diagram of an example server suitable for use with various embodiments.

The various embodiments may be implemented on any of a variety of commercially available server devices, such as the server 500 illustrated in FIG. 5. For example, with reference to FIGS. 1-5, a server 500 (which may correspond, for example, to the server 500 and/or the remote computing device 326 in FIGS. 1 and 3, respectively) may include a processor 501 coupled to volatile memory 502 and a large capacity nonvolatile memory, such as a disk drive 503. The server 500 may also include a floppy disc drive, compact disc (CD) or DVD disc drive 504 coupled to the processor 501. The server 500 may also include network access ports 506 coupled to the processor 501 for establishing network interface connections with a network 507, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Figure 6:
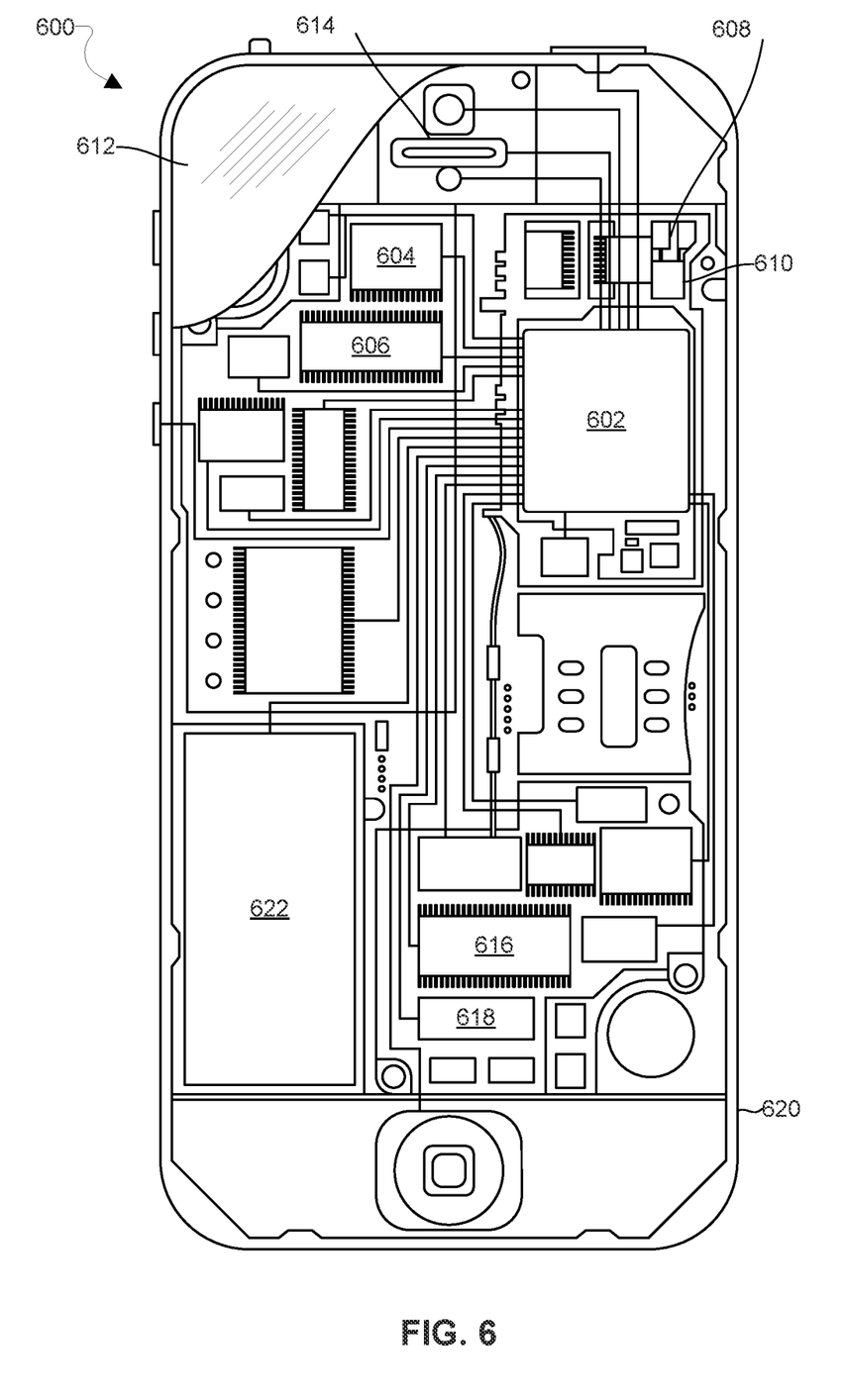
FIG. 6 is a component diagram of an example wireless communication device suitable for use with the various embodiments.

Various embodiments may also be implemented in any of a variety of wireless devices, an example of which is illustrated in FIG. 6. For example, with reference to FIGS. 1-6, a wireless device 600 (which may correspond, for example, the user wireless devices 102, 202) may include a processor 602 coupled to a touchscreen controller 604 and an internal memory 606. The processor 602 may be one or more multicore integrated circuits (ICs) designated for general or specific processing tasks. The internal memory 606 may be volatile or non-volatile memory, and may also be secure and/or encrypted memory, or unsecure and/or unencrypted memory, or any combination thereof.

The touchscreen controller 604 and the processor 602 may also be coupled to a touchscreen panel 612, such as a resistive-sensing touchscreen, capacitive-sensing touchscreen, infrared sensing touchscreen, etc. The wireless device 600 may have one or more radio signal transceivers 608 (e.g., Peanut®, Bluetooth®, Zigbee®, Wi-Fi, RF radio) and antennae 610, for sending and receiving, coupled to each other and/or to the processor 602. The transceivers 608 and antennae 610 may be used with the above-mentioned circuitry to implement the various wireless transmission protocol stacks and interfaces. The wireless device 600 may include a cellular network wireless modem chip 616 that enables communication via a cellular network and is coupled to the processor.

The wireless device 600 may include a peripheral device connection interface 618 coupled to the processor 602. The peripheral device connection interface 618 may be singularly configured to accept one type of connection, or multiply configured to accept various types of physical and communication connections, common or proprietary, such as USB, FireWire, Thunderbolt, or PCIe. The peripheral device connection interface 618 may also be coupled to a similarly configured peripheral device connection port (not shown). The wireless device 600 may also include speakers 614 for providing audio outputs.

The wireless device 600 may also include a housing 620, constructed of a plastic, metal, or a combination of materials, for containing all or some of the components discussed herein. The wireless device 600 may include a power source 622 coupled to the processor 602, such as a disposable or rechargeable battery. The rechargeable battery may also be coupled to the peripheral device connection port to receive a charging current from a source external to the wireless device 600.

The processors 501, 602, and modem or modem chip 616 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in an internal memory before they are accessed and loaded into the processors 501, 602, and modem or modem chip 616.

The processors 501, 602, and modem or modem chip 616 may include internal memory sufficient to store the application software instructions. In many devices the internal memory may be a volatile or nonvolatile memory, such as flash memory, or a mixture of both. For the purposes of this description, a general reference to memory refers to memory accessible by the processors 501, 602, and modem or modem chip 616, including internal memory or removable memory plugged into the wireless communication device and memory within the processors 501, 602, and modem or modem chip 616 themselves.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers.

Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of supporting emergency service calls using dynamic service set identifier (SSID) deployment in a wireless communication network, the method comprising:
   receiving, by an access point, an emergency service call request from a user device;
   sending, by the access point, a message with information about the received emergency service call request to a wireless network manager;
   determining whether to serve the emergency service call request based on a response message received from the wireless network manager; and
   in response to determining to serve the emergency service call request:
      deploying, by the access point, a new service set identifier (SSID) with emergency service call capability for the user device, wherein the new SSID is based on a preconfigured SSID template locally stored by the access point, and wherein the preconfigured SSID template comprises a data structure that includes configuration instructions for creating an SSID with emergency service features enabled; and
      withdrawing the new SSID from service once the emergency service call on the user device has ended.

2. The method of claim 1, further comprising, in response to determining to serve the emergency service call request:
   sending to the user device a message identifying the new SSID and network access information indicating Unauthenticated Emergency Service Accessible (UESA);
   associating the user device with the network using UESA policies; and
   assigning required network resources to the user device for the requested emergency service call.

3. The method of claim 2, wherein associating the user device with the network includes providing information about the user device location to the wireless network manager.

4. The method of claim 2, wherein associating the user device with the network includes communicating with an access control/location service using Remote Authentication Dial-In User Service (RADIUS) protocol messaging.

5. The method of claim 1, further comprising:
receiving, from the wireless network manager, the preconfigured SSID template; and
storing the received preconfigured SSID template as a configuration object in a repository on the access point.

6. The method of claim 1, wherein the access point is a wireless access point implementing IEEE 802.11 technical standards.

7. The method of claim 1, wherein the response message received from the wireless network manager identifies a target access point, wherein the target access point is selected from among capable access points within a coverage area of the user device.

8. The method of claim 7, wherein selection of the target access point is based at least in part on proximity of the user device, current network conditions, and a maximum number of concurrent emergency calls allowed per access point.

9. A computing device, comprising:
a processor configured with executable instructions configured to cause the processor to perform operations comprising:
receiving an emergency service call request from a user device;
sending a message with information about the received emergency service call request to a wireless network manager;
determining whether to serve the emergency service call request based on a response message received from the wireless network manager; and
in response to determining to serve the emergency service call request:
deploying a new service set identifier (SSID) with emergency service call capability for the user device, wherein the new SSID is based on a preconfigured SSID template locally stored by the access point, and wherein the preconfigured SSID template comprises a data structure that includes configuration instructions for creating an SSID with emergency service features enabled;
withdrawing the new SSID from service once the emergency service call on the user device has ended.

10. The computing device of claim 9, wherein the processor is configured with executable instructions configured to cause the processor to perform operations further comprising, in response to determining to serve the emergency service call request:
sending to the user device a message identifying the new SSID and network access information indicating Unauthenticated Emergency Service Accessible (UESA);
associating the user device with the network using UESA policies; and
assigning required network resources to the user device for the requested emergency service call.

11. The computing device of claim 10, wherein the processor is configured with executable instructions configured to cause the processor to perform operations such that associating the user device with the network includes providing information about the user device location to the wireless network manager.

12. The computing device of claim 10, wherein the processor is configured with executable instructions configured to cause the processor to perform operations such that associating the user device with the network includes communicating with an access control/location service using Remote Authentication Dial-In User Service (RADIUS) protocol messaging.

13. The computing device of claim 9, wherein the processor is configured with executable instructions configured to cause the processor to perform operations further comprising:
receiving, from the wireless network manager, the preconfigured SSID template; and
storing the received preconfigured SSID template as a configuration object in a repository on the access point.

14. The computing device of claim 9, wherein the processor is configured with executable instructions configured to cause the processor to perform operations such that the access point is a wireless access point implementing IEEE 802.11 technical standards.

15. The computing device of claim 9, wherein the response message received from the wireless network manager identifies a target access point, and wherein the target access point is selected from among capable access points within a coverage area of the user device.

16. The computing device of claim 15, wherein selection of the target access point is based at least in part on proximity of the user device, current network conditions, and a maximum number of concurrent emergency calls allowed per access point.

17. A non-transitory processor-readable medium having stored thereon processor-executable instructions configured to cause a processing device to perform operations comprising:
receiving an emergency service call request from a user device;
sending a message with information about the received emergency service call request to a wireless network manager;
determining whether to serve the emergency service call request based on a response message received from the wireless network manager; and
in response to determining to serve the emergency service call request:
deploying a new service set identifier (SSID) with emergency service call capability for the user device, wherein the new SSID is based on a preconfigured SSID template locally stored by the access point, and wherein the preconfigured SSID template comprises a data structure that includes configuration instructions for creating an SSID with emergency service features enabled;
withdrawing the new SSID from service once the emergency service call on the user device has ended.

18. The non-transitory processor-readable medium of claim 17, wherein the stored processor-executable instructions are configured to cause the processing device to perform operations further comprising, in response to determining to serve the emergency service call request:
sending to the user device a message identifying the new SSID and network access information indicating Unauthenticated Emergency Service Accessible (UESA);
associating the user device with the network using UESA policies; and
assigning required network resources to the user device for the requested emergency service call.

19. The non-transitory processor-readable medium of claim 18, wherein the stored processor-executable instructions are configured to cause the processing device to perform operations such that associating the user device with the network includes providing information about the user device location to the wireless network manager.

20. The non-transitory processor-readable medium of claim 18, wherein the stored processor-executable instructions are configured to cause the processing device to perform operations such that associating the user device with the network includes communicating with an access control/location service using Remote Authentication Dial-In User Service (RADIUS) protocol messaging.

21. The non-transitory processor-readable medium of claim 17, wherein the stored processor-executable instructions are configured to cause the processing device to perform operations further comprising:
   receiving, from the wireless network manager, the preconfigured SSID template; and
   storing the received preconfigured SSID template as a configuration object in a repository on the access point.

22. The non-transitory processor-readable medium of claim 17, wherein the stored processor-executable instructions are configured to cause the processing device to perform operations such that the access point is a wireless access point implementing IEEE 802.11 technical standards.

23. The non-transitory processor-readable medium of claim 17, wherein the response message received from the wireless network manager identifies a target access point, and wherein the target access point is selected from among capable access points within a coverage area of the user device.

24. The non-transitory processor-readable medium of claim 23, wherein selection of the target access point is based at least in part on proximity of the user device, current network conditions, and a maximum number of concurrent emergency calls allowed per access point.

* * * * *